(12) United States Patent
Herbaut

(10) Patent No.: US 6,923,472 B1
(45) Date of Patent: Aug. 2, 2005

(54) AIR BAG COVER

(75) Inventor: Olivier Herbaut, Gondecourt (FR)

(73) Assignee: Plastic Omnium Auto Interieur Societe Anonyme, Lyons (FR)

( * ) Notice: Subject to any disclaimer, the term of this patent is extended or adjusted under 35 U.S.C. 154(b) by 0 days.

(21) Appl. No.: 09/170,189

(22) Filed: Oct. 13, 1998

(51) Int. Cl.⁷ .............................................. B60R 21/20
(52) U.S. Cl. ................................................ 280/728.3
(58) Field of Search ......................... 280/728.1, 728.3, 280/730.2, 732, 728.2

(56) References Cited

U.S. PATENT DOCUMENTS

| | | | | |
|---|---|---|---|---|
| 3,801,126 A | * | 4/1974 | Knight et al. | 280/732 |
| 4,327,937 A | * | 5/1982 | Scholz et al. | 280/732 |
| 4,893,833 A | * | 1/1990 | DiSalvo et al. | 280/732 |
| 4,925,209 A | * | 5/1990 | Sakurai | 280/728.3 |
| 5,161,819 A | * | 11/1992 | Rhodes, Jr. | 280/728 |
| 5,431,433 A | * | 7/1995 | Steimke et al. | 280/728.3 |
| 5,480,183 A | * | 1/1996 | Ward et al. | 280/728.2 |
| 5,556,126 A | * | 9/1996 | Lee | 280/728.3 |
| 5,651,562 A | * | 7/1997 | Hagen et al. | 280/728.3 |
| 5,673,931 A | * | 10/1997 | Gray et al. | 280/728.3 |
| 5,845,931 A | * | 12/1998 | Nagy et al. | 280/728.3 |
| 5,863,064 A | * | 1/1999 | Rheinlander et al. | 280/732 |

* cited by examiner

Primary Examiner—Faye M. Fleming
(74) Attorney, Agent, or Firm—Harrison & Egbert

(57) ABSTRACT

A cover (1) for an inflatable bag or cushion type retaining device (6), in particular a lateral one, including at least a body (2), a mechanism for retaining the body (2) and a mechanism for fixing the body (2), directly or indirectly, to the bodywork (5) of a vehicle.

The body (2) of the cover (1) is constituted by at least two layers, namely:
a layer (8) permitting the shaping and the self-maintaining of the said cover (2);
a layer (9) allowing the fixing mechanism to be attached to the body (2);

The fixing mechanism is designed to be added on and capable of giving way under the action of the retaining device (6) when it is triggered, so as to enable the cover (1) to open without the body (2) tearing.

6 Claims, 2 Drawing Sheets

AIR BAG COVER

TECHNICAL FIELD

The present invention relates to a cover for an inflatable bag or cushion type retaining device, as well as to an item of inside trim for a vehicle including such a cover.

Although more especially intended to equip lateral retaining devices, it can also be used with retaining devices located in other parts of a vehicle, such as, in particular, the dashboard, the seats or other parts.

BACKGROUND ART

There are presently known inflatable bag or cushion type retaining devices provided in the area of the dashboard, the door panels and/or the seat backs.

They use rigid covers, obtained by injection moulding, integrated in the panels of materials that surround them. The covers are provided in the mass of weakened zones the failure of which enables the cover to open when the retaining devices are triggered.

There are also known inflatable bag or cushion type retaining devices provided in the area of the windscreen posts, the front and/or rear bottom runners, the upper central support and/or the rear quarter. They are designed to deploy to form a bolster-shaped bag or cushion suspended in the area of the side windows of the vehicle.

Very often, the covers of these devices are provided with a decorative covering made of synthetic materials (thermoplastic sheets, knitted, woven or non-woven fabric) to form a lining piece.

In this case, problems are posed in connection with the tear strength of the decorative material in the weakened zone of the covers. The lining piece then has to be removed completely to enable the retaining device to function.

Complex, costly systems for swinging and retaining the lining piece upon the triggering of the retaining system have thus been developed. Sometimes, even, the proximity of the vehicle occupant precludes the use of such devices and, as a result, one is faced with an impossible situation.

Soft trim, or covering, elements of textile material having a seam provided in the mass in the area of the weakened zone to permit their failure have also been developed. When the inflatable bag or cushion type retaining device is triggered, the seam is sectioned through the effect of the expansion of the device and thus permits deployment.

It is found, however, that this solution restricts the choice of materials that can be used. These must, indeed, be tearable. In addition, after triggering, the covering element is destroyed, thus precluding any re-use.

The object of the present invention is to provide a cover for an inflatable bag or cushion type retaining device that overcomes the aforementioned drawbacks.

Another object of the present invention is to provide a lit for an inflatable bag or cushion type retaining device that offers a wider choice of materials that can be used to facilitate its decoration.

Another object of the present invention is to provide a cover for an inflatable bag or cushion type retaining device that is possibly re-usable and that enables the destruction of the cover after the device has been triggered to be avoided.

Another object of the present invention is to provide a cover for an inflatable bag or cushion type retaining device that is lighter, the weight being divided by as much as 4, thus making it possible to reduce the inertia and/or stresses set up and to re-dimension the cover holding devices so that they are lighter and less expensive.

Another object of the present invention is to provide a cover for an inflatable bag or cushion type retaining device that contributes to the acoustic insulation of the vehicle equipped therewith.

Another object of the present invention is to provide a cover for an inflatable bag or cushion type retaining device providing, directly or indirectly, a trim or covering for the bodywork of the vehicle equipped therewith.

Further objects and advantages of the invention will emerge in the course of the description that follows, which is given only by way of illustration and is not intended to limit same.

SUMMARY OF THE INVENTION

The present invention relates, in the first place, to a cover for an inflatable bag or cushion type retaining device, in particular a lateral one, including at least a body, means for retaining the body and means for fixing the body, directly or indirectly, to the bodywork of a vehicle, in which:

the body of the cover is constituted by at least two layers, namely:
  a layer permitting the shapping and the self-maintaining of the cover;
  a layer allowing the fixing means to be attached to the body;
the fixing means are designed to be added on and capable of giving way under the action of the retaining device when it is triggered, so as to enable the cover to open without the said body tearing.

The invention also relates to an item of inside trim for a vehicle, including:
a bodywork element having a housing receiving an inflatable bag or cushion type retaining device;
a cover as described above covering the housing.

BRIEF DESCRIPTION OF THE DRAWINGS

The invention will be more readily understood upon studying the following description accompanied by the annexed drawings, which form an integral part thereof, and wherein.

DETAILED DESCRIPTION OF THE INVENTION

The present invention relates to a cover for an inflatable bag or cushion type retaining device, in particular a lateral one.

However, although more especially intended for such applications, it can also be used for inflatable bag or cushion type retaining devices located in other parts of the vehicle, such as, for example, the dashboard or a seat.

Figure 1:
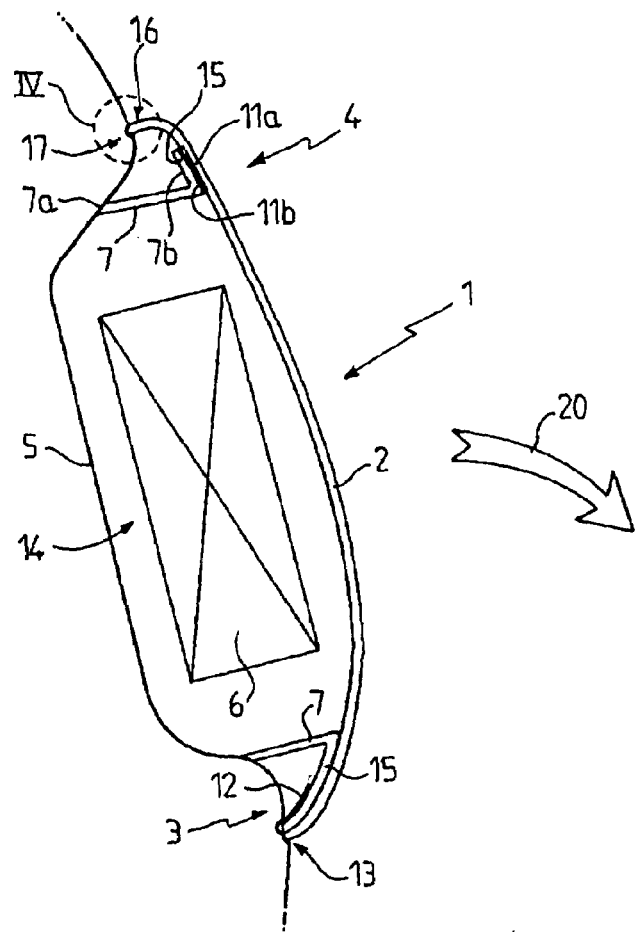
FIG. 1 is a lateral cross-sectional view illustrating an exemplary form of embodiment of the cover according to the invention installed in the area of a bottom runner of a vehicle.

As shown in FIG. 1, cover 1 according to the invention includes at least a body 2, means 3 for retaining the body 2 and means 4 for fixing the body 2 to the bodywork 5 of a vehicle.

It thus enables an inflatable bag or cushion type retaining device, diagrammatically illustrated in dotted lines, to be concealed, at least partially.

According to a first form of embodiment, body 2 is fixed directly to the bodywork 5. According to another form of embodiment, the body 2 is fixed indirectly to the bodywork 5, in particular, as described in greater detail below, via a projection 7.

So as to enable the cover 1 to open, and thus permit the deployment of retaining device 6 in the passenger compartment of the vehicle, the fixing means 4 are designed to be capable of giving way under the action of the retaining device 6 when it is triggered.

As the cover 1 is removably fixed to bodywork 5, it can thus be moved away, in particular in the direction of arrow 20, without either tearing of the body 2 or damage thereto. If so wished, it can then be re-used.

This being the case, the retaining means 3 make it possible to prevent the cover 1 from becoming a projectile when the said retaining device 6 is triggered by keeping it connected, for example, to the bodywork 5.

Figure 2:
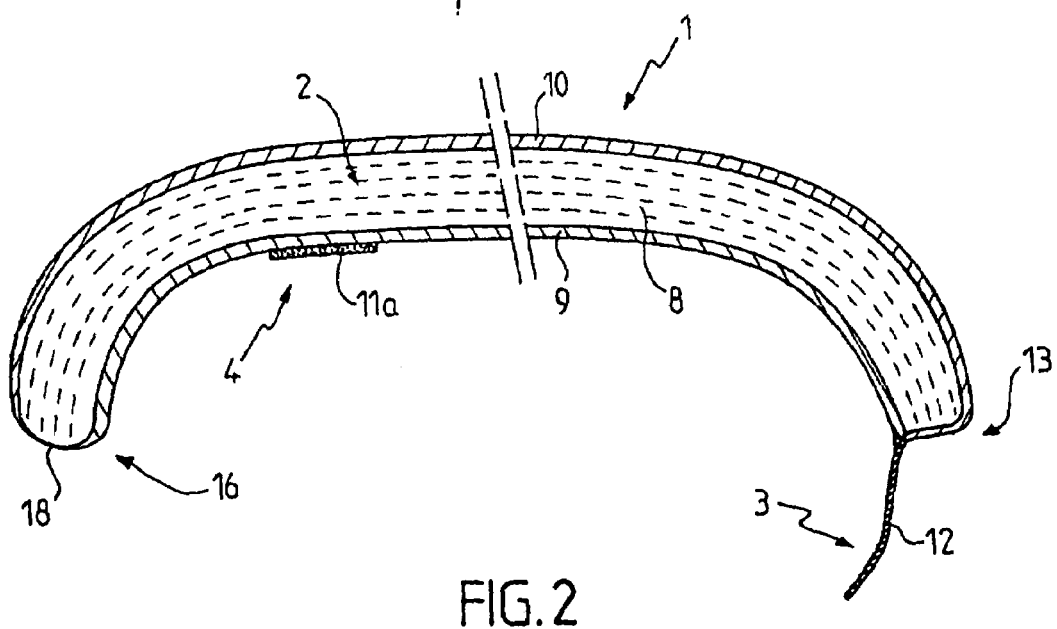
FIG. 2 is a detailed view of the cover shown in FIG. 1 above.

Furthermore, as shown in FIG. 2, the fixing means 4 are designed to be added on to body 2 and the latter, which is designed to be multi-layer, is constituted by at least a layer 8 permitting the shaping and self-maintaining of the cover 1, and by a layer 9 allowing the said fixing means 4 to be attached to the body 2.

Cover 1 can thus define, for example, a plane or shaped piece, having hollows and/or protuberances enabling its profile to fit that of the bodywork 5 and/or surrounding items of trim. The latter form, for example, a frame around the cover 1.

According to one exemplary form of embodiment of the invention, the body 2 further includes an embellishing sheet 10, intended, in particular, to be orientated towards the passenger compartment. It is constituted, for example, by a woven, non-woven, knitted or calendered synthetic material or by leather.

The formation and maintaining layer 8 is provided, in particular, between the attachment layer 9 and the embellishing layer 10.

It is constituted, for example, by a thermoformable synthetic cellular material, in particular a thermoplastic or semi-thermoplastic material such as polyolefins. It may possibly take the form of a foam.

By way of a non-limitative example, the material used to constitute the formation and maintaining layer 8 has, for example, a density of 10 to 100 kg/m$^3$, in particular approximately 50 kg/m$^3$.

It thus reduces the risks of fragmentation of cover 1 under the thrust of retaining device 6 when it expands.

It is also to be noted that the material chosen is capable, for example, of preserving its mechanical properties over a large range of temperatures, for example from −35 to +80° C.

The fixing means 4 are constituted, in particular, by two elements, 11a, 11b, capable of being rendered integral with, and of being detached from, one another, one of them, 11a, being secured to the body 2 and the other, 11b, being designed to be capable of being secured, directly or indirectly, to the bodywork 5.

By way of a non-limitative example, these can be fixing elements of the VELCRO(™), i.e. complementary strips of hook-and-loop material.

Figure 3:
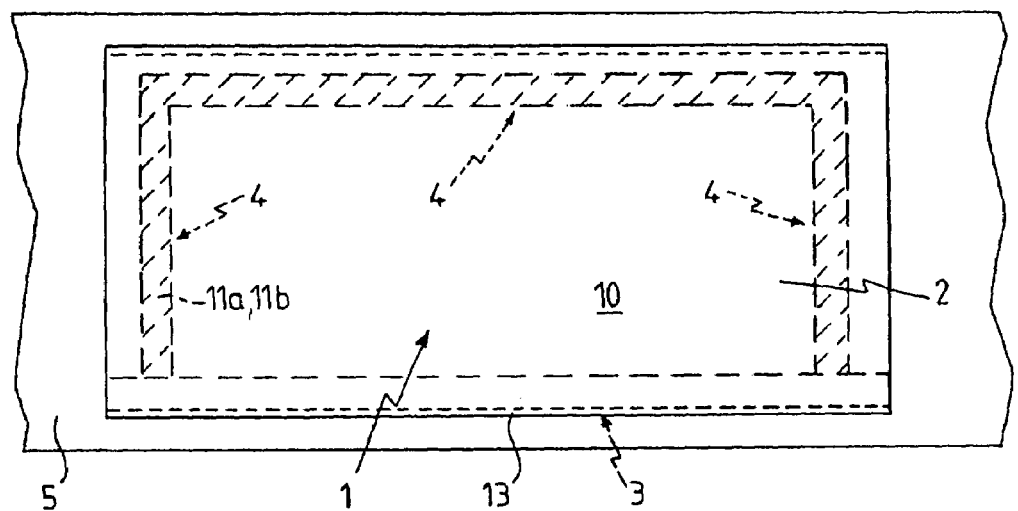
FIG. 3 is a front view corresponding to FIG. 1 above.

Fixing means 4, for example formed by strips, are provided, in particular, in the vicinity of the edges of the body 2, on a part of its periphery, as illustrated by the dashed line shading in FIG. 3.

The cover 1 is, for example, substantially quadrangular and fixing means 4 are then disposed on three of its sides.

As to retaining means 3, they can also be provided, partially, on the periphery of the body 2, in particular in a manner complementary to that of the fixing means 4.

According to the example mentioned earlier, retaining means 3 are located on one of the sides, in particular on the remaining one.

Referring again to FIGS. 1 and 2, it will be noted that the retaining means 3 are constituted, for example, in the mass of the body 2 by a flap of flexible material 12, provided along one of its edges, 13, capable of being permanently fixed, directly or indirectly, to the bodywork 5 to constitute a hinge.

The flap or flexible material 12 has, for example, a thickness in the order of one tenth of the mean thickness of the rest of the body 2. It is attached, in particular, by riveting to the bodywork 5 and/or to an element built onto to the latter, such as the projection 7.

According to another form of embodiment, not illustrated, the retaining means 3 are constituted, for example, by VELCRO(™) type (i.e. hook-and-loop material strips) elements, the surface bonding strength of which is greater than that of those used as fixing means 4.

The present invention also relates to an item of inside trim for a vehicle including a bodywork element 5, having a housing 14 receiving an inflatable bag or cushion type retaining device, and a cover 1, as described above, covering the housing 14.

The item of trim is provided, for example, in the are of the windscreen posts, the front and/or rear bottom runners, the upper central support and/or the rear quarter.

As mentioned earlier, it possibly further includes a projection 7 resting in the housing 14 at one, 7a, of its ends and co-operating, at least partially, with the fixing means 4, at the other end, 7b.

The projection 7 is provided, in particular, over the entire contour of housing 14 and thus constitutes, for example, a cavity inside which the retaining device 6 is provided.

End 7b of the distance piece 7 co-operating with the said fixing means 4 has, for example, a shoulder 15 on which the retaining means 3 and/or the element 11b of the said fixing means 4, such as, for example, one of the VELCRO(™) type hook-and-loop material strips, is/are secured.

The fixing means 4 are provided, for example, slightly back from the edges of the body 2, thus leaving the latter free and unfixed, at the very least over a portion of the contour of the cover 1.

Figure 4:
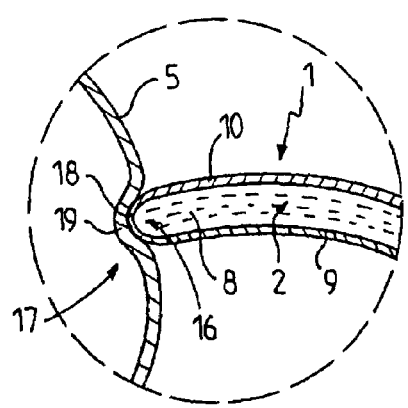
FIG. 4 is a detailed view of the zone marked IV in FIG. 1 above.

In this connection, as illustrated in detail in FIG. 4, the edge of the cover 1 possibly has a formed zone 16 for co-operating with a facing formed zone 17 on the bodywork element 5 or one of its trim or covering elements located in the vicinity of the housing 14.

It thus enables a clear interface to be defined in the area of the contour of the cover 1. The said formed zones are constituted, in particular, by facing grooves and/or flat portions. They can also include a rounded portion 18, provided on the body 2 and co-operating with a groove 19 provided in the bodywork element 5.

It should further be noted that the use of a layer of foam based material enables such a rounded portion 18 to be defined.

The inflatable bag or cushion type retaining device and/or thin hinge-forming portion 12 are provided, for example, at a lower portion of the housing 14.

By way of example, the body 2 is obtained using a process according to which embellishing sheet 10 is adhered to the formation and maintaining layer 8, in particular by flame treatment or gluing, the layer 9 enabling fixing means 4 to be attached also being placed on the layer 8 to form a complex.

The fixing means 4 are added on, in particular, by gluing or sewing.

Other forms of embodiment, within the grasp of a man of the art, could of course, have been contemplated without thereby departing from the scope of the invention.

What is claimed is:

1. An air bag assembly for use in a vehicle comprising:
   an air bag which is capable of being inflated;
   a vehicle bodywork;
   a body having a first layer and a second layer, said first layer being of a thermoformable synthetic cellular material which rigidifies said body, said body having a first edge and a second edge;
   a retaining means for permanently retaining said body to said vehicle bodywork, said retaining means comprising a flap of flexible material integrally formed with and extending from said first edge of said body, said flap being permanently affixed to said vehicle bodywork such that said body is in hinged relationship to said vehicle bodywork; and
   a fixing means for releasably fixing said body to said vehicle bodywork, said fixing means for releasing from said vehicle bodywork when said air bag is inflated such that said air bag inflates without tearing said body or said flap of flexible material, said fixing means being secured to said second layer, said fixing means comprising a first strip of hook-and-loop material and a second strip of hook-and-loop material complementary to one another and detachably engaged with one another, one of said first and second strips being secured to said body, the other of said first and second strips being secured directly onto said vehicle bodywork.

2. The assembly of claim 1, said body having an embellishment sheet extending over a surface of said first layer opposite said second layer.

3. The assembly of claim 1, said fixing means being affixed adjacent said second edge of said body.

4. An air bag assembly for a vehicle comprising:
   an air bag which is capable of being inflated;
   a bodywork having a housing, said housing receiving said air bag therein; and
   a cover means affixed to said bodywork and covering said air bag, said cover means comprising a body having a flap of flexible material integrally formed with and extending from one edge of said body, said flap of flexible material permanently secured to said bodywork, said body having an opposite edge detachably secured to said bodywork, said body further comprising complementary strips of hook-and-loop material engaged together, one of said complementary strips being affixed to said body, the other of said complementary strips secured directly to said bodywork, said cover means for releasing from said housing when said air bag is inflated so as to release the inflated air bag from said housing without tearing either said body or said flap of flexible material.

5. The air bag assembly of claim 4, said bodywork comprising a projection extending outwardly of said housing, said projection having one end affixed to said bodywork and another end adjacent said opposite edge of said body.

6. The air bag assembly of claim 4, said body having a rounded portion at said opposite edge, said rounded portion releasably received within a groove formed on said bodywork.

* * * * *